United States Patent [19]

Taniguchi et al.

[11] Patent Number: 4,980,590
[45] Date of Patent: Dec. 25, 1990

[54] FLAT BRUSHLESS MOTOR WITH A BACK-YOKE FORMED AS AN ECCENTRIC WEIGHT TO INDUCE VIBRATIONS

[75] Inventors: Shinobu Taniguchi; Miyuki Furuya; Makoto Hasegawa, all of Yonago, Japan

[73] Assignee: Matsushita Electric Industrial Co., Ltd., Osaka, Japan

[21] Appl. No.: 381,693

[22] PCT Filed: Sep. 30, 1988

[86] PCT No.: PCT/JP88/00998
§ 371 Date: Jun. 29, 1989
§ 102(e) Date: Jun. 29, 1989

[30] Foreign Application Priority Data

Sep. 30, 1987 [JP] Japan .................. 62-246383

[51] Int. Cl.[5] .............. H02K 7/06; H02K 1/22; F16H 33/14
[52] U.S. Cl. .............................. 310/81; 310/80; 310/268; 310/156; 74/61; 318/114
[58] Field of Search ............... 74/61; 128/34, 35, 36; 318/114; 310/46, 80, 81, 82, 268, 156

[56] References Cited

U.S. PATENT DOCUMENTS 4,361,776 11/1982 Hayashi et al. .............. 310/268
4,644,246 2/1987 Knapen .......................... 310/156

FOREIGN PATENT DOCUMENTS 49-14605 12/1974 Japan .
56-102966 8/1981 Japan .
59-85072 6/1984 Japan .
59-209057 11/1984 Japan .
2184296 6/1987 United Kingdom .............. 310/81

Primary Examiner—Steven L. Stephan
Assistant Examiner—C. LaBalle
Attorney, Agent, or Firm—Wenderoth, Lind & Ponack

[57] ABSTRACT

A flat brushless motor utilizable as a warning means in a portable communication device such as a pocket bell. The flat brushless motor is such that the center of gravity of the back-yoke (5a) is displaced from the center of rotation so that, by the rotation of the unbalanced back-yoke (5a), vibrations can be generated and, by the elimination of a weight or the like for generating the vibrations, the manufacture in a flat and compact size as well as the reduction in number of component parts can be attained.

6 Claims, 2 Drawing Sheets

List of Reference Numerals In the Drawings

1 ... Magnet

2 ... Rotor Frame

3 ... Bracket

3a... Carrier

4 ... Coils

5a... Back-yoke

7 ... Shaft

8 ... Metal

9 ... Rotor Boss

FLAT BRUSHLESS MOTOR WITH A BACK-YOKE FORMED AS AN ECCENTRIC WEIGHT TO INDUCE VIBRATIONS

FIELD OF TECHNOLOGY

This invention relates to a flat brushless motor utilizable as a source of vibrations in a portable communication device such as a pocket bell utilizing vibrations to provide an audible signal to a particular person.

BACKGROUND ART

An example of the conventional flat brushless motor of the above described type will be discussed.

FIG. 4 illustrates the conventional flat brushless motor of rotary back-yoke type. Reference numeral 1 represents a flat annular magnet magnetized in a circumferential direction so as to have alternating N- and S-poles; reference numeral 2 represents a rotor frame made of a magnetizable body; reference numeral 3 represents a bracket made of a magnetizable body; reference numeral 3a represents a carrier made of insulating material for holding coils; reference numeral 4 represents a plurality of flat coils fixed to the carrier 3a in face-to-face relationship with the magnet 1; reference numeral 5 represents a back-yoke for enclosing a magnetic circuit of main magnetic fluxes produced by the magnet 1; and reference numeral 6 represents a weight formed into a generally rectangular shape for causing the motor to generate unbalanced vibrations. Reference numeral 7 represents a shaft of the motor; reference numeral 8 represents a metal bearing; and reference numeral 9 represents a rotor boss rigidly mounted on the shaft 7 and to which the rotor frame 2 and the back-yoke 5 are secured.

FIG. 5 illustrates the shape of the weight 6.

FIG. 6 is a perspective view of the conventional flat brushless motor of rotary back-yoke type.

With respect to the conventional flat brushless motor of rotary back-yoke type constructed as hereinabove described, the operation thereof will be described hereinafter.

Assuming that magnetic fluxes are generated from the magnet 1, the magnetic flux developing towards the bracket 3 is shielded by the rotor frame 2 and the bracket 3. Because of this, the main magnetic flux develops in a direction towards the coil 4. If an electric current is allowed to flow across the coils 4 under this condition, a magnetic field is developed by the current and a rotating force is produced by the relationship with the magnetic flux of the magnet 1. Also, a magnetic circuit is formed by the magnetic flux towards the back-yoke 5 to thereby increase the efficiency. The weight 6 is fixed to the shaft 7 with its center of gravity displaced from the shaft so that the weight 6 is in an unbalanced relationship with the shaft 7 to allow the motor to produce an unbalanced rotation when the weight 6 is driven to produce vibrations.

However, in the conventional construction, since a portion corresponding to the weight 6 increases the thickness of the motor, there are some problems in that flattening of the motor, is hampered and the number of manufacturing steps as well as the number of component parts is increased. Accordingly, the present invention has for its object to provide a flat brushless motor of a thin type capable of generating vibrations. Also, the present invention has for its object to provide a flat brushless motor capable of, reducing the number of component parts and the number of manufacturing steps.

DISCLOSURE OF THE INVENTION

In order to accomplish these objects, the present invention is constructed so as to have a back-yoke with no weight used and of which the center of gravity is moved to a position other than the center of rotation. Accordingly, by the rotation of the unbalance back-yoke, vibrations are generated and, also, by the elimination of the weight, it can be possible to flatten the motor, and to, reduce the number of component parts, the number of manufacturing steps and the cost.

Also, the present invention has the following relationship:

$$e \times 2\pi/60 \geqq 2.5$$

wherein N (rpm) represents the speed of rotation of the back-yoke and e (mm) represents the displacement of the center of gravity relative to the center of rotation of the back-yoke. Because of this, the extent can be established so that vibrations resulting from the displacement of the center of gravity of the back-yoke can be assuredly transmitted to the user. Also, the present invention is such that, of the radii of two or more sector-shaped shaping the back-yoke, the minimum radius is of a value not smaller than the distance from the center of rotation of a rotor yoke to an outer end of the coils and the maximum radius is of a value not greater than the outer diameter of the motor. Therefore, the magnetic fluxes of the magnet and the coils can be assured trapped by the back-yoke with no efficiency of the magnetic circuit being substantially lowered. In addition, since the back-yoke is small as compared with the outer diameter of the motor, no miniaturization of the device will not be hampered.

BEST MODE FOR CARRYING OUT THE INVENTION

One embodiment of the present invention will be hereinafter described with reference to the drawings.

Figure 1:
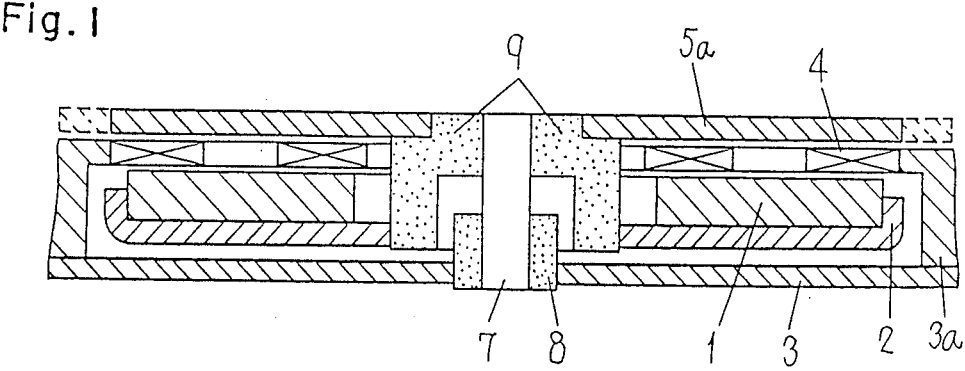
FIG. 1 is a sectional view of a flat brushless motor in one embodiment of the present invention.
Figure 2:
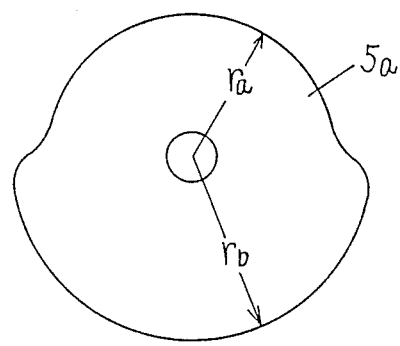
FIG. 2 is a front elevational view of a back-yoke in one embodiment of the present invention.
Figure 3:
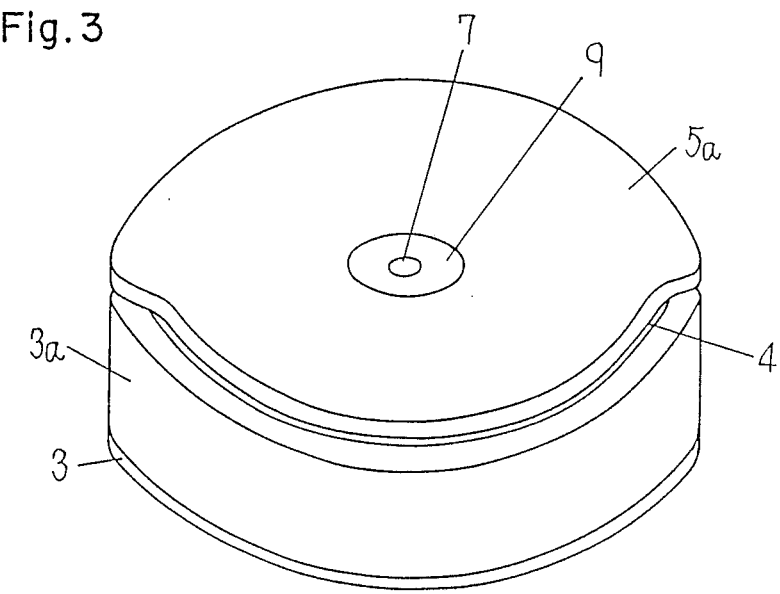
FIG. 3 is a perspective view of the flat brushless motor in one embodiment of the present invention.
Figure 4:
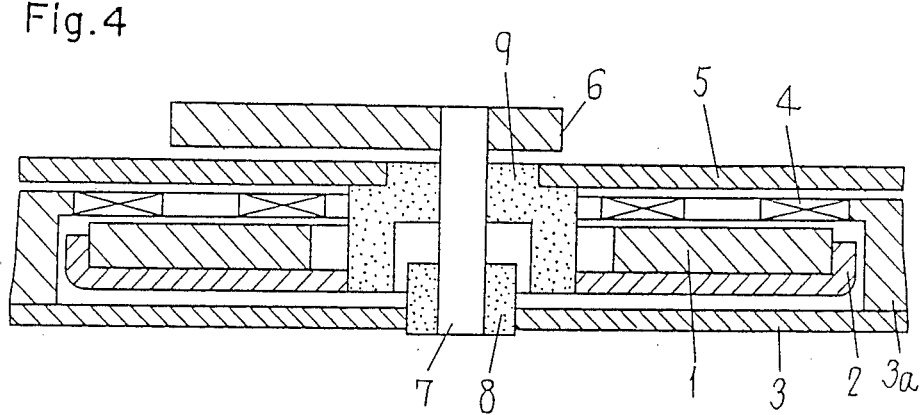
FIG. 4 is a sectional view of the conventional flat brushless motor.
Figure 5:
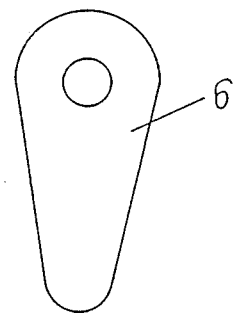
FIG. 5 is a front elevational view of the weight in the conventional brushless motor.
Figure 6:
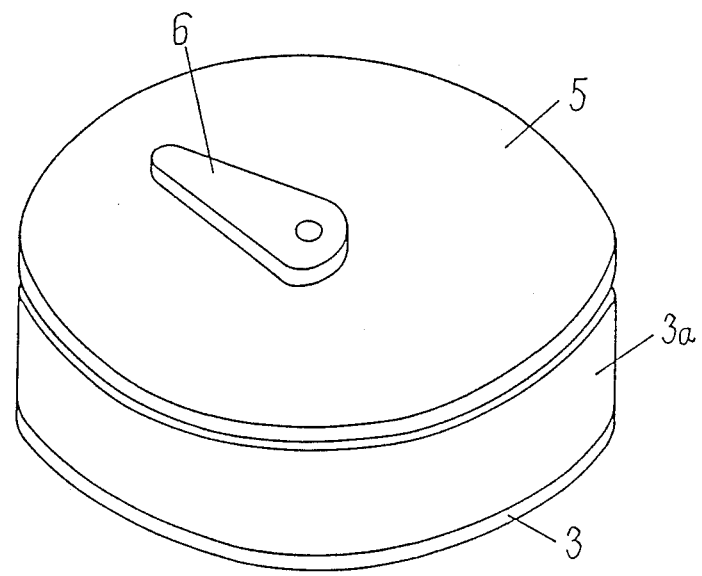
FIG. 6 is a perspective view of the conventional flat brushless motor.

FIG. 1 illustrates a sectional view of a flat brushless motor in one embodiment of the present invention. FIG. 2 illustrates a back-yoke of the flat brushless motor in one embodiment of the present invention. FIG. 3 is a perspective view of said flat brushless motor. In these figures, reference numeral 1 is a flat annular magnet magnetized so as to have alternating N- and S-poles in a circumferential direction in which magnetic fluxes are generated; reference numeral 2 represents a dish-shaped rotor frame made of a magnetizable body; reference numeral 3 represents a bracket made of a magnetizable body and disposed at a bottom portion of the motor; and reference numeral 3a represents an annular carrier made of insulating material and fixed to the bracket 3 for holding the coils 4. Reference numeral 4 represents a plurality of flat coils intersecting the magnetic fluxes resulting from the magnet 1 and operable to generate a rotating force when an electric current flows therethrough, reference numeral 5a represents a back-yoke for enclosing a magnetic circuit of main magnetic fluxes resulting from the magnet 1; reference numeral 8 represents a metal fixed to the bracket for rotatably supporting the shaft 7; and reference numeral 9 represents a rotor bosses fixed to the shaft 7 to which the rotor frame 2 and the back-yoke 5a are rigidly secured.

The back-yoke 5a is of a non-circular shape and represents a shape corresponding to the shape of two sector shapes of different radii combined together. Both of the two sector shapes have a center angle of 180°. As one example, if the radius ra of the smaller sector shape is 15 mm and the radius rb of the larger sector shape is 17 mm, the displacement e of the center of gravity relative to the center of rotation of the back-yoke 6a will be 32 μm and, if the number of revolution of the motor is assumed to be 3000 rpm, $$e \times (2\pi N)/60 = \times 10^{-3} \times (2 \times \pi \times 3000)/60 = 10.05 \text{ (mm/sec)}$$

The value of 10.05 (mm/sec) represents the velocity of movement of the center of gravity resulting from the rotation of the back-yoke and, the greater this value, the greater the vibration.

With respect to the flat brushless motor so constructed as hereinabove described, the operation thereof will be hereinafter described. Since as hereinbefore described the back-yoke 5a is of a non-circular shape having its center of gravity displaced relative to the center of rotation thereof, an magnetic unbalance and an unbalance resulting from a mechanical non-equilibrium are produced and vibrations are generated by the overall accumulation of these unbalances.

Also, since an end of a portion of the smaller sector shape of the back-yoke 5a is located substantially at the same position as an outer end of the coils 4 and an end of a portion of the larger sector shape thereof is substantially equal to an outer diameter of the motor, flattening and miniaturization can be accomplished without the efficiency of the motor being lowered. It is to be noted that, in the illustrated embodiment, the use has been made of the back-yoke 5a of a shape corresponding to the combined two sector shapes, However, the present invention may not be limited to such shape, but the shape of the back-yoke can be suitably determined within the scope of the gist of the technological contents set forth in the scope of claims.

INDUSTRIAL APPLICABILITY

As hereinbefore described, the flat brushless motor according to the present invention, which is effective to generate vibrations without using any weight because the center of gravity of the back-yoke is displaced relative to the center of rotation, can be compactly manufactured with the number of component parts being minimized and is suited for use as a warning means in a portable communication device such as a pocket bell.

We claim:

1. A flat brushless motor comprising a flat annular magnet magnetized in a circumferential direction on an end face thereof having alternating north and south poles, a rotor yoke on which the magnet is fixed, a holding portion for holding the rotor yoke, a bracket provided with a bearing for rotatably bearing the holding portion, a back-yoke having one face arranged in a face-to-face relationship with the magnet and fixedly mounted on the holding portion, and a plurality of flat coils disposed spacedly between the magnet and the back-yoke, the back-yoke having a center of gravity displaced relative to a center of rotation thereof, a distance between the center of gravity of the back-yoke and the center of rotation of the back-yoke being at least $2.5/(2\pi N/60)$mm, N being a speed of rotation of the back-yoke in revolutions per minute.

2. The flat brushless motor as defined in claim 1, wherein the holding portion comprises a shaft rotatably supported by the bearing and a rotor boss secured to the shaft.

3. The flat brushless motor as defined in claim 1, wherein the back-yoke is of a non-circular shape.

4. A flat brushless motor comprising a flat annular magnet magnetized in a circumferential direction on an end face thereof having alternating north and south poles, a rotor yoke on which the magnet is fixed, a holding portion for holding the rotor yoke, a bracket provided with a bearing for rotatably bearing the holding portion, a back-yoke having one face arranged in a face-to-face relationship with the magnet and fixedly mounted on the holding portion, the back-yoke for impeding the passage therethrough of a magnetic flux generated by the magnet, and a plurality of flat coils disposed spacedly between the magnet and the back-yoke, the back-yoke having a shape corresponding to at least two sector shapes of different radii combined together and having a center of gravity displaced relative to a center of rotation thereof according to the at least two sector shapes of the back-yoke.

5. A flat brushless motor comprising a flat annular magnet magnetized in a circumferential direction on an end face thereof having alternating north and south poles, a rotor yoke on which the magnet is fixed, a holding portion for holding the rotor yoke, a bracket provided with a bearing for rotatably bearing the holding portion, a back-yoke having one face arranged in a face-to-face relationship with the magnet and fixedly mounted on the holding portion, and a plurality of flat coils disposed spacedly between the magnet and the back-yoke, the back-yoke having a shape corresponding to at least two sector shapes of different radii combined together and having a center of gravity displaced relative to a center of rotation thereof, a minimum radius of the at least two sector shaped being not less than a distance from a center of rotation of the rotor yoke to an outer end of the coils and a maximum radius of the at least two sector shapes being not greater than an outer diameter of the motor.

6. A flat brushless motor as recited in claim 4, a distance between the center of gravity of the back-yoke and the center of rotation of the back-yoke being at least $2.5/(2\pi N/6)$mm, N being a speed of rotation of the back-yoke in revolutions per minute.

* * * * *